(12) United States Patent
Salter et al.

(10) Patent No.: US 11,433,778 B2
(45) Date of Patent: Sep. 6, 2022

(54) VEHICLE DISTANCE-TO-EMPTY PREDICTION SYSTEM

(71) Applicant: FORD GLOBAL TECHNOLOGIES, LLC, Dearborn, MI (US)

(72) Inventors: Stuart C. Salter, White Lake, MI (US); Katherine Howard-Cone, Canton, MI (US); Justin Carmen Campanaro, Ferndale, MI (US); Erik Biberstein, Novi, MI (US); Ryan Hunt, Royal Oak, MI (US)

(73) Assignee: Ford Global Technologies, LLC, Dearborn, MI (US)

(\*) Notice: Subject to any disclaimer, the term of this patent is extended or adjusted under 35 U.S.C. 154(b) by 159 days.

(21) Appl. No.: 17/020,261

(22) Filed: Sep. 14, 2020

(65) Prior Publication Data

US 2022/0080854 A1    Mar. 17, 2022

(51) Int. Cl.
*B60L 58/12* (2019.01)
(52) U.S. Cl.
CPC .......... *B60L 58/12* (2019.02); *B60L 2250/16* (2013.01); *B60L 2260/52* (2013.01); *B60L 2260/54* (2013.01); *B60Y 2200/91* (2013.01)
(58) Field of Classification Search
None
See application file for complete search history.

(56) References Cited

U.S. PATENT DOCUMENTS

| 2014/0278089 | A1  | 9/2014  | Gusikhin et al. |
| 2015/0239455 | A1* | 8/2015  | Qiu ............................ B60K 6/40 701/22 |
| 2015/0291036 | A1* | 10/2015 | Ryu ........................ B60K 35/00 701/22 |
| 2016/0129803 | A1* | 5/2016  | Grewal ................. B60W 40/12 701/123 |
| 2017/0282744 | A1  | 10/2017 | Koo et al. |
| 2020/0160619 | A1* | 5/2020  | Wang ...................... G06N 5/046 |
| 2021/0323439 | A1* | 10/2021 | Sivertsson .............. B60L 58/12 |

FOREIGN PATENT DOCUMENTS

KR          20190122404 A     10/2019

\* cited by examiner

*Primary Examiner* — James J Lee
*Assistant Examiner* — David Hatch
(74) *Attorney, Agent, or Firm* — David B Kelley; Brooks Kushman P.C.

(57) ABSTRACT

A vehicle includes an electric machine, a battery, a power takeoff, a display unit, and a controller. The electric machine is configured to propel the vehicle. The battery is configured to provide electrical power to the electric machine. The power takeoff is configured to transfer power from the battery to one or more external devices. The display unit is configured to display a distance-to-empty. The controller is programmed to, adjust the distance-to-empty based on an expected energy use of the one or more external devices.

18 Claims, 2 Drawing Sheets

VEHICLE DISTANCE-TO-EMPTY PREDICTION SYSTEM

TECHNICAL FIELD

The present disclosure relates to distance-to-empty prediction systems for vehicles.

BACKGROUND

Vehicles may include an interface that displays the remaining distance a vehicle may travel until the vehicle is predicted to consume the remaining fuel or energy that the vehicle is currently storing.

SUMMARY

A vehicle includes an electric machine, a battery, a power takeoff, an inverter circuit, a controller, and a display unit. The electric machine is configured to propel the vehicle. The battery is configured to provide electrical power to the electric machine. The power takeoff is configured to transfer power from the battery to one or more external devices that are connected to the power takeoff. The inverter circuit is configured transfer power from the battery to the electric machine and from the battery to the power takeoff. The controller is programmed to, estimate a distance-to-empty based on a charge of the battery, estimate an expected energy use of the one or more external devices, and adjust the distance-to-empty based on the expected energy use of the one or more external devices. The display is configured to display the adjusted distance-to-empty.

A vehicle includes an electric machine, a battery, a power takeoff, a display unit, and a controller. The electric machine is configured to propel the vehicle. The battery is configured to provide electrical power to the electric machine. The power takeoff is configured to transfer power from the battery to one or more external devices. The display unit is configured to display a distance-to-empty. The controller is programmed to, adjust the distance-to-empty based on an expected energy use of the one or more external devices.

A method of adjusting a distance-to-empty of an electric vehicle includes calculating the distance-to-empty based on a charge of a propulsion battery of the electric vehicle; estimating an expected energy use of one or more external devices that are configured to draw power from the propulsion battery when connected to a power takeoff of the electric vehicle; and adjusting the distance-to-empty based on the expected energy use of the one or more external devices.

DETAILED DESCRIPTION

Embodiments of the present disclosure are described herein. It is to be understood, however, that the disclosed embodiments are merely examples and other embodiments may take various and alternative forms. The figures are not necessarily to scale; some features could be exaggerated or minimized to show details of particular components. Therefore, specific structural and functional details disclosed herein are not to be interpreted as limiting, but merely as a representative basis for teaching one skilled in the art to variously employ the embodiments. As those of ordinary skill in the art will understand, various features illustrated and described with reference to any one of the figures may be combined with features illustrated in one or more other figures to produce embodiments that are not explicitly illustrated or described. The combinations of features illustrated provide representative embodiments for typical applications. Various combinations and modifications of the features consistent with the teachings of this disclosure, however, could be desired for particular applications or implementations.

Figure 1:
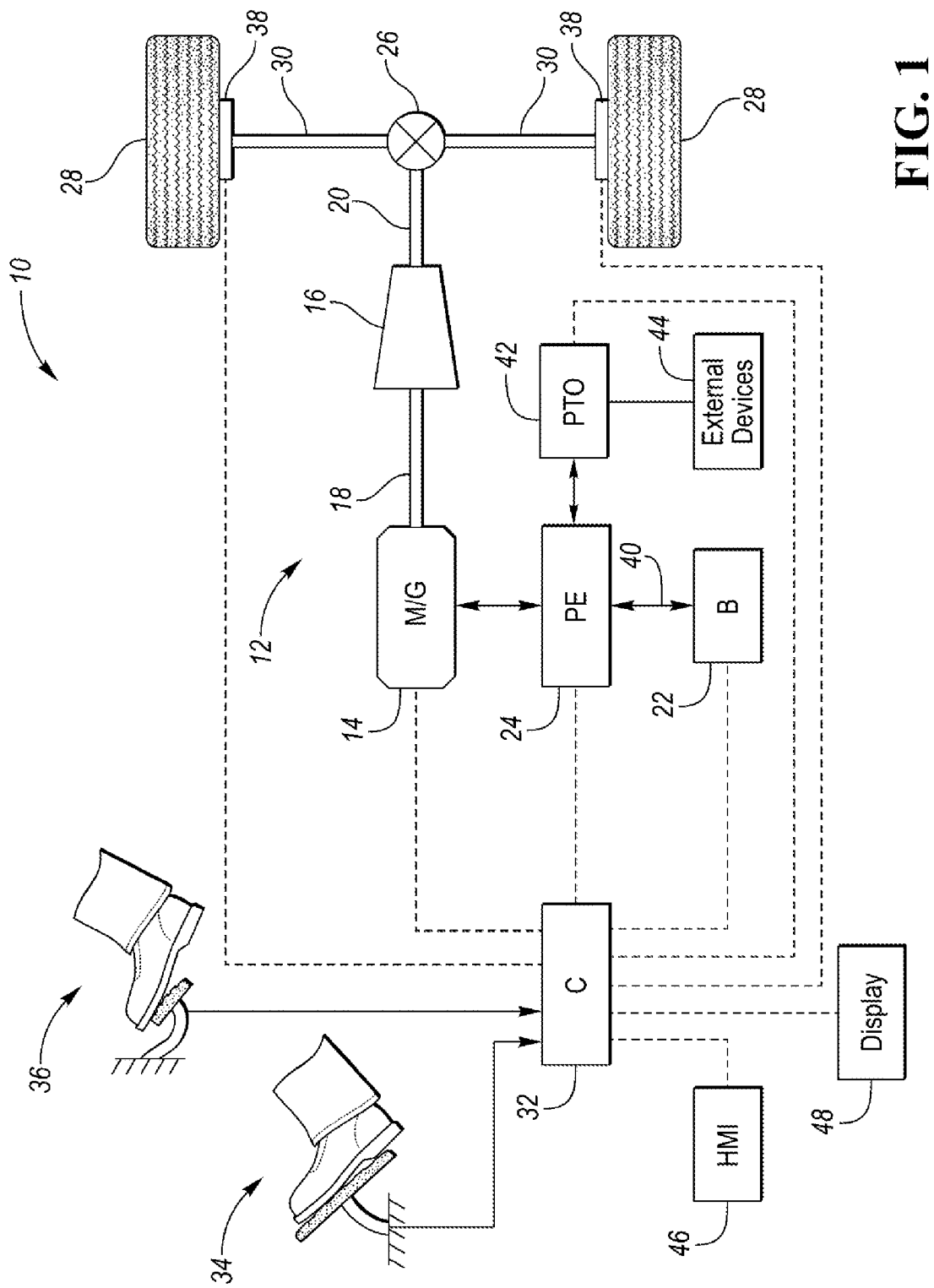
FIG. 1 is a schematic illustration of a representative powertrain of an electric vehicle.

Referring to FIG. 1, a schematic diagram of an electric vehicle 10 is illustrated according to an embodiment of the present disclosure. FIG. 1 illustrates representative relationships among the components. Physical placement and orientation of the components within the vehicle may vary. The electric vehicle 10 includes a powertrain 12. The powertrain 12 includes an electric machine such as an electric motor/generator (M/G) 14 that drives a transmission (or gearbox) 16. More specifically, the M/G 14 may be rotatably connected to an input shaft 18 of the transmission 16. The transmission 16 may be placed in PRNDSL (park, reverse, neutral, drive, sport, low) via a transmission range selector (not shown). The transmission 16 may have a fixed gearing relationship that provides a single gear ratio between the input shaft 18 and an output shaft 20 of the transmission 16. A torque converter (not shown) or a launch clutch (not shown) may be disposed between the M/G 14 and the transmission 16. Alternatively, the transmission 16 may be a multiple step-ratio automatic transmission. An associated traction battery 22 is configured to deliver electrical power to or receive electrical power from the M/G 14.

The M/G 14 is a drive source for the electric vehicle 10 that is configured to propel the electric vehicle 10. The M/G 14 may be implemented by any one of a plurality of types of electric machines. For example, M/G 14 may be a permanent magnet synchronous motor. Power electronics 24 condition direct current (DC) power provided by the battery 22 to the requirements of the M/G 14, as will be described below. For example, the power electronics 24 may provide three phase alternating current (AC) to the M/G 14.

If the transmission 16 is a multiple step-ratio automatic transmission, the transmission 16 may include gear sets (not shown) that are selectively placed in different gear ratios by selective engagement of friction elements such as clutches and brakes (not shown) to establish the desired multiple discrete or step drive ratios. The friction elements are controllable through a shift schedule that connects and disconnects certain elements of the gear sets to control the ratio between the transmission output shaft 20 and the transmission input shaft 18. The transmission 16 is automatically shifted from one ratio to another based on various vehicle and ambient operating conditions by an associated controller, such as a powertrain control unit (PCU). Power and torque from the M/G 14 may be delivered to and received by transmission 16. The transmission 16 then provides powertrain output power and torque to output shaft 20.

It should be understood that the hydraulically controlled transmission 16, which may be coupled with a torque converter (not shown), is but one example of a gearbox or transmission arrangement; any multiple ratio gearbox that accepts input torque(s) from a power source (e.g., M/G 14) and then provides torque to an output shaft (e.g., output shaft 20) at the different ratios is acceptable for use with embodiments of the present disclosure. For example, the transmission 16 may be implemented by an automated mechanical (or manual) transmission (AMT) that includes one or more servo motors to translate/rotate shift forks along a shift rail to select a desired gear ratio. As generally understood by those of ordinary skill in the art, an AMT may be used in applications with higher torque requirements, for example.

As shown in the representative embodiment of FIG. 1, the output shaft 20 is connected to a differential 26. The differential 26 drives a pair of drive wheels 28 via respective axles 30 connected to the differential 26. The differential 26 transmits approximately equal torque to each wheel 28 while permitting slight speed differences such as when the vehicle turns a corner. Different types of differentials or similar devices may be used to distribute torque from the powertrain to one or more wheels. In some applications, torque distribution may vary depending on the particular operating mode or condition, for example.

The powertrain 12 further includes an associated controller 32 such as a powertrain control unit (PCU). While illustrated as one controller, the controller 32 may be part of a larger control system and may be controlled by various other controllers throughout the vehicle 10, such as a vehicle system controller (VSC). It should therefore be understood that the powertrain control unit 32 and one or more other controllers can collectively be referred to as a "controller" that controls various actuators in response to signals from various sensors to control functions such as operating the M/G 14 to provide wheel torque or charge the battery 22, select or schedule transmission shifts, etc. Controller 32 may include a microprocessor or central processing unit (CPU) in communication with various types of computer readable storage devices or media. Computer readable storage devices or media may include volatile and nonvolatile storage in read-only memory (ROM), random-access memory (RAM), and keep-alive memory (KAM), for example. KAM is a persistent or non-volatile memory that may be used to store various operating variables while the CPU is powered down. Computer-readable storage devices or media may be implemented using any of a number of known memory devices such as PROMs (programmable read-only memory), EPROMs (electrically PROM), EEPROMs (electrically erasable PROM), flash memory, or any other electric, magnetic, optical, or combination memory devices capable of storing data, some of which represent executable instructions, used by the controller in controlling the engine or vehicle.

The controller 32 communicates with various vehicle sensors and actuators via an input/output (I/O) interface (including input and output channels) that may be implemented as a single integrated interface that provides various raw data or signal conditioning, processing, and/or conversion, short-circuit protection, and the like. Alternatively, one or more dedicated hardware or firmware chips may be used to condition and process particular signals before being supplied to the CPU. As generally illustrated in the representative embodiment of FIG. 1, controller 32 may communicate signals to and/or receive signals from the M/G 14, battery 22, transmission 16, power electronics 24, and any another component of the powertrain 12 that may be included, but is not shown in FIG. 1 (i.e., a launch clutch that may be disposed between the M/G 14 and the transmission 16. Although not explicitly illustrated, those of ordinary skill in the art will recognize various functions or components that may be controlled by controller 32 within each of the subsystems identified above. Representative examples of parameters, systems, and/or components that may be directly or indirectly actuated using control logic and/or algorithms executed by the controller 32 include front-end accessory drive (FEAD) components such as an alternator, air conditioning compressor, battery charging or discharging, regenerative braking, M/G 14 operation, clutch pressures for the transmission gearbox 16 or any other clutch that is part of the powertrain 12, and the like. Sensors communicating input through the I/O interface may be used to indicate wheel speeds (WS1, WS2), vehicle speed (VSS), coolant temperature (ECT), accelerator pedal position (PPS), ignition switch position (IGN), ambient air temperature (e.g., ambient air temperature sensor 33), transmission gear, ratio, or mode, transmission oil temperature (TOT), transmission input and output speed, deceleration or shift mode (MDE), battery temperature, voltage, current, or state of charge (SOC) for example.

Control logic or functions performed by controller 32 may be represented by flow charts or similar diagrams in one or more figures. These figures provide representative control strategies and/or logic that may be implemented using one or more processing strategies such as event-driven, interrupt-driven, multi-tasking, multi-threading, and the like. As such, various steps or functions illustrated may be performed in the sequence illustrated, in parallel, or in some cases omitted. Although not always explicitly illustrated, one of ordinary skill in the art will recognize that one or more of the illustrated steps or functions may be repeatedly performed depending upon the particular processing strategy being used. Similarly, the order of processing is not necessarily required to achieve the features and advantages described herein, but is provided for ease of illustration and description. The control logic may be implemented primarily in software executed by a microprocessor-based vehicle and/or powertrain controller, such as controller 32. Of course, the control logic may be implemented in software, hardware, or a combination of software and hardware in one or more controllers depending upon the particular application. When implemented in software, the control logic may be provided in one or more computer-readable storage devices or media having stored data representing code or instructions executed by a computer to control the vehicle or its subsystems. The computer-readable storage devices or media may include one or more of a number of known physical devices which utilize electric, magnetic, and/or optical storage to keep executable instructions and associated calibration information, operating variables, and the like.

An accelerator pedal 34 is used by the driver of the vehicle to provide a demanded torque, power, or drive command to the powertrain 12 (or more specifically M/G 14) to propel the vehicle. In general, depressing and releasing the accelerator pedal 34 generates an accelerator pedal position signal that may be interpreted by the controller 32 as a demand for increased power or decreased power, respectively. A brake pedal 36 is also used by the driver of the vehicle to provide a demanded braking torque to slow the vehicle. In general, depressing and releasing the brake pedal 36 generates a brake pedal position signal that may be interpreted by the controller 32 as a demand to decrease the vehicle speed. Based upon inputs from the accelerator pedal 34 and brake pedal 36, the controller 32 commands the torque and/or power to the M/G 14, and friction brakes 38. The controller 32 also controls the timing of gear shifts within the transmission 16.

The M/G 14 may act as a motor and provide a driving force for the powertrain 12. To drive the vehicle with the M/G 14 the traction battery 22 transmits stored electrical energy through wiring 40 to the power electronics 24 that may include inverter and rectifier circuitry, for example. The inverter circuitry of the power electronics 24 may convert DC voltage from the battery 22 into AC voltage to be used by the M/G 14. The rectifier circuitry of the power electronics 24 may convert AC voltage from the M/G 14 into DC voltage to be stored with the battery 22. The controller 32 commands the power electronics 24 to convert voltage from the battery 22 to an AC voltage provided to the M/G 14 to provide positive or negative torque to the input shaft 18.

The M/G 14 may also act as a generator and convert kinetic energy from the powertrain 12 into electric energy to be stored in the battery 22. More specifically, the M/G 14 may act as a generator during times of regenerative braking in which torque and rotational (or kinetic) energy from the spinning wheels 28 is transferred back through the transmission 16 and is converted into electrical energy for storage in the battery 22.

It should be understood that the schematic illustrated in FIG. 1 is merely representative and is not intended to be limiting. Other configurations are contemplated without deviating from the scope of the disclosure. It should be understood that the vehicle configuration described herein is merely exemplary and is not intended to be limited. Other electric or hybrid electric vehicle configurations should be construed as disclosed herein. Other electric or hybrid vehicle configurations may include, but are not limited to, series hybrid vehicles, parallel hybrid vehicles, series-parallel hybrid vehicles, plug-in hybrid electric vehicles (PHEVs), fuel cell hybrid vehicles, battery operated electric vehicles (BEVs), or any other vehicle configuration known to a person of ordinary skill in the art.

In hybrid configurations that include an internal combustion engine such as a gasoline, diesel, or natural gas powered engine, or a fuel cell, the controller 32 may be configured to control various parameters of such an internal combustion engine. Representative examples of internal combustion parameters, systems, and/or components that may be directly or indirectly actuated using control logic and/or algorithms executed by the controller 32 include fuel injection timing, rate, and duration, throttle valve position, spark plug ignition timing (for spark-ignition engines), intake/exhaust valve timing and duration, etc. Sensors communicating input through the I/O interface from such an internal combustion engine to the controller 32 may be used to indicate turbocharger boost pressure, crankshaft position (PIP), engine rotational speed (RPM), intake manifold pressure (MAP), throttle valve position (TP), exhaust gas oxygen (EGO) or other exhaust gas component concentration or presence, intake air flow (MAF), etc.

The vehicle 10 may include a power takeoff 42 that is configured to transfer electrical power from the battery 22 via the power electronics 24 to one or more external devices 44 that are connected to the power takeoff 42. More specifically, the power the takeoff 42 may be configured to transfer power from the battery 22 via the inverter circuitry of the power electronics 24 to the one or more external devices 44 that are connected to the power takeoff 42. The power takeoff 42 may comprise one or more electrical outlets or may simply comprise any type of hardwired connection, such as fixed hardwired connection, between the inverter circuitry of the power electronics 24 and the external devices 44. The one or more external devices 44 may be any type of device that is configured to receive electrical power, such as power tools (e.g., saws or drills), lighting devices, air compressors, refrigeration systems, stoves, microwaves, cement mixers, etc. The system may be referred to as a "power to the box" feature that transfers electrical power from the battery 22 via the power electronics 24 to any external device.

Additionally, the electric machine 14 may be configured to provide electrical power to the power takeoff 42 and any external device 44 that is connected to the power takeoff 42. The electric machine 14 may be connected to the power takeoff 42 through the power electronics 24. The controller 32 may be configured to control the amount of electric current that is being delivered from the electric machine 14 and/or the battery 22 to the power takeoff 42.

The vehicle 10 may also include a human machine interface (HMI) 46 that is in communication with the controller 32. The HMI 46 may include an interface that allows an operator or user to input an expected energy use of the one or more external devices 44. For example, the interface may include control buttons or a touch screen that allows an operator to input which external devices 44 are connected to the power takeoff 42 or are expected to be connected to the power takeoff 42, the power requirement to operate each external device 44, and an expected duration of use of each external device 44. Since power multiplied by time is equal to energy, the expected total energy use of all the external devices 44 may be determined once the power requirements to operate each external device 44 and an expected duration of use of each external device 44 is input into the HMI. The controller 32, however, may include stored values of the power requirements to operate each external device 44. If the controller includes such stored values, the operator may only need to input the expected duration of use of each external device 44 in order for the controller 32 to calculate the expected energy use of each external device 44. The controller 32 may be programed to identify which external device 44 is connected to the power takeoff 42.

The vehicle 10 may also include a display screen or display unit 48. The display unit 48 may be a subcomponent of the HMI 46 (e.g., a touchscreen) or may be a separate component from the HMI 46. The display unit 48 may be configured to display a distance-to-empty projection or prediction. The distance-to-empty projection may be stored as logic within the controller 32. The controller 32 then transmits the distance-to-empty projection to the display unit 48, which displays the distance-to-empty projection for the vehicle operator to observe. The distance-to-empty projection may be based on the amount of energy stored within the battery 22 and the operating efficiency (i.e., the distance the vehicle travels per unit of energy) of the vehicle 10. The energy stored within the battery may be reflected as a function of the state of charge of the battery. More specifically, the distance-to-empty projection may be based on the product of the amount of energy stored within the battery 22 and the operating efficiency of the vehicle 10. Furthermore, the distance-to-empty projection may be adjusted to account for the expected energy use of the one or more external devices 44 that is input into the HMI 46. More specifically, the amount of energy that is expected to be directed to operating the one or more external devices 44 will be subtracted from the energy stored within the battery 22 when calculating the distance-to-empty projection. Alternatively, the amount of energy that is expected to be directed to operating the one or more external devices 44 may be based on historical energy usage of the one or more external devices 44 during previous drive cycles as opposed to an expected energy use of the one or more external devices 44 that is input into the HMI 46.

The display unit 48 may also list the external devices 44 that are connected to the power takeoff 42, external devices 44 that are expected to draw power from the power takeoff 42, the power requirement for each external device 44, the expected energy use of each external device 44, and a reduction in the distance-to-empty projection resulting from the expected energy use of each external device 44.

It should be understood that the schematic illustrated in FIG. 1 is merely representative and is not intended to be limiting. Other configurations are contemplated without deviating from the scope of the disclosure. For example, the vehicle powertrain 12 may be configured to deliver power and torque to the one or both of the front wheels as opposed to the illustrated rear wheels 28.

Figure 2:
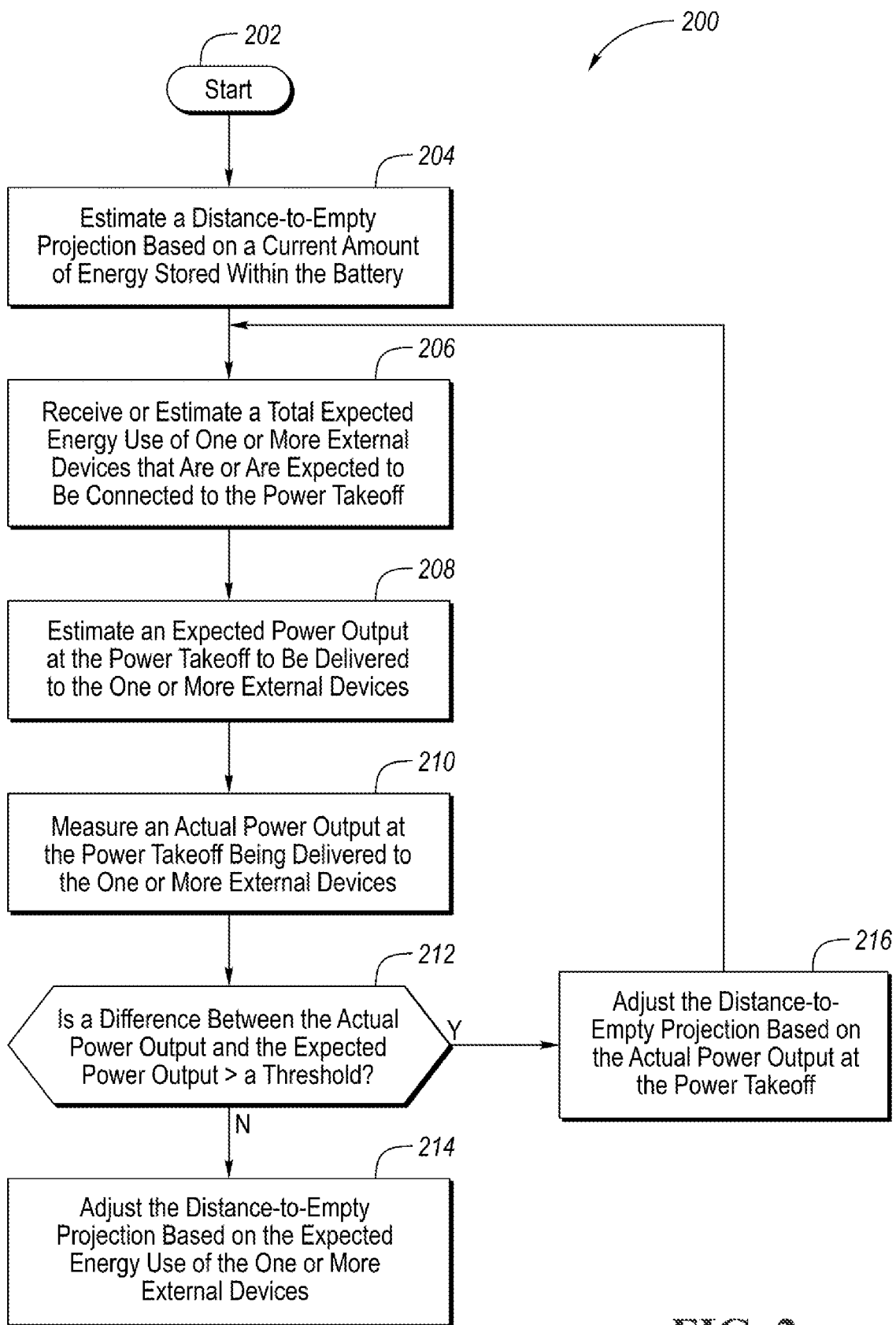
FIG. 2 is a flowchart illustrating a method of adjusting a distance-to-empty projection.

Referring to FIG. 2, a method 200 of adjusting the distance-to-empty prediction, estimation, or projection of the vehicle 10 is illustrated. The method 200 may be stored as control logic and/or an algorithm within the controller 32. The controller 32 may implement the method 200 by controlling the various components of the vehicle 10. The method 200 is initiated at start block 202. The method 200 may be initiated at start block 202 by turning a start key or ignition of the vehicle 10 to an "on" position. The method 200 then moves on to block 204 where the distance-to-empty projection of the vehicle is estimated based on the current amount of energy stored in the battery 22. The current amount of energy stored in the battery 22 may be a function of the state of charge of the battery 22. A specific amount of stored energy within the battery 22 may correspond to a specific distance the vehicle 10 may travel for the distance-to-empty projection. For example, 200 W/H stored within the battery 22 may correspond to 1 mile of available travel for the distance-to-empty projection.

Next, the method 200 moves on to block 206 where a total expected energy use of the one or more external devices 44 that are or are expected to be connected to the power takeoff 42 is estimated or received. The total expected energy use may specifically refer to the energy from the battery 22 that is expected to be utilized by the one or more external devices 44. The total expected energy use of one or more external devices 44 may be input into the controller (e.g., via the HMI 46), may be based on historical data (i.e., historical energy usage of the one or more external devices 44 during previous drive cycles), or may be based on a combination of input information and historical data. More specifically, the total expected energy use of the one or more external devices 44 may be manually input into the controller 32 via the HMI 46. Alternatively, the total expected energy use of the one or more external devices 44 may be retrieved from a calendar program that is stored within the controller 32, which includes scheduled uses of specific external devices 44. Such specific uses may include an expected time duration of use and the expected power draw from each external device 44. The calendar program that may alternatively be stored within a personal device (e.g., cellular phone) that communicates with the controller 32 through any type of wireless communication (e.g., Bluetooth).

If the total expected energy use is based on historical energy uses, the expected energy use may account for specific operators of the vehicle 10. For example, the HMI 46 may request an operator identification (ID) or the controller 32 may identify an operator by the presence of a personal device (e.g., cellular phone) within the vehicle 10. More specifically, the controller 32 may identify an operator by the presence of such a personal device at the driver seat of the vehicle 10. Such an identification may occur through any type of wireless communication between the personal device and the controller 32, such as Bluetooth. Once a specific operator is identified, the controller 32 may access stored data that is indicative of the values of historical energy usage of the one or more external devices 44 during previous drive cycles of the specific operator.

Alternatively, a total expected energy use that is based on historical energy uses may be based on determining which specific external devices 44 are connected to the power takeoff 42 and/or which specific external devices 44 are expected to draw power from the power takeoff 42, whether or not connected to the power takeoff 42.

If a total expected energy use, which is based on the historical energy use, is also based on which specific external devices 44 are connected to the power takeoff 42, the controller 32 may assume the specific external devices 44 will be drawing power from the battery 22. The controller 32 may access stored data that is indicative of the energy use of the specific external devices 44 during previous drive cycles or that is indicative of scheduled energy uses (e.g., via a calendar program as describe above) of the specific external devices 44. The controller 32 may then utilize such data to estimate the expected energy uses of the specific external devices 44. For example, the estimated energy uses of the specific external devices 44 may be an average of the energy uses of the specific external devices 44 during the previous drive cycles. Furthermore, if an additional external device 44 is connected to the power takeoff 42, an expected energy use of such an additional external device 44 may be added to the total expected energy use of the one or more external devices 44, or if an additional external device 44 is disconnected from the power takeoff 42, an expected energy use of such an additional external device 44 may set to zero or may be subtracted from to the value of the total expected energy use prior to the additional external device 44 being disconnected.

If the total expected energy use, which is based on the historical energy use, is also based on an expectation that specific external devices 44 will draw power from the power takeoff 42, whether or not connected to the power takeoff 42, the historical energy use may be based on a historical pattern of previous uses of such devices 44, may be based on a specific operator being identified, may be based on a location of the vehicle (which may be determined via global positioning system), may be based on a current route the vehicle is traveling on, or may be based on any other statistical data that may be stored within the controller 32 that indicates that such specific external devices 44 will draw energy from the battery 22 or are likely to draw energy from the battery 22. Such expected energy uses of specific external devices 44, whether or not connected to the power takeoff 42, may be an average of the energy uses of the specific external devices 44 during previous drive cycles.

The historical energy use may factor in the probability that such an energy use may occur. For example, if a specific external device 44 historically utilizes 100 W/H and there is a 60% probability that the specific external device 44 will be utilized and draw energy from the battery 22, the estimated historical energy use of such an external device 44 may be product of the energy historically utilized by the external device 44 and the probability that the external device 44 will be utilized (i.e., 60 W/H in this example).

The method 200 next moves on to block 208, where an expected power output at the power takeoff 42 is calculated or estimated. More specifically, the expected power to be delivered from the battery 22 to the one or more external devices 44 at power takeoff 42 is calculated or estimated. The expected power to be delivered from the battery 22 to the one or more external devices 44 at the power takeoff 42 may be based on the power requirement to operate each external device 44, which may be input into the controller 32, may be learned by the controller 32 during previous uses, or may be communicated to the controller 32 via individual external devices 44. More specifically, the expected power to be delivered to the one or more external devices 44 at the power takeoff 42 may be the sum of the expected power consumptions of all the external devices 44 plus any additional amount to account for efficiency loses in the system (e.g., inefficiencies of the battery 22, the power electronics 24, the power takeoff 42, and/or the one or more external devices 44). The expected power consumption of each of the external device 44 may be specific to an expected time window or a specific time duration such that the controller 32 may expect specific external devices 44 to consume power only during the expected time window or only over a specific time duration. It should be noted that product of the power requirement to operate each external device 44 and the time duration over which each external device is operated (i.e., the expected time window or the specific time duration) is equal to the expected energy use of each external device 44. It should also be noted that the sum of the expected energy uses or each external device 44 is equal to the total expected energy use of all of the external devices 44.

Next, the method 200 moves on to block 210, where an actual power output at the power takeoff 42 being delivered from the battery 22 to the one or more external devices 44 is measured. Sensors may be configured to measure the power being delivered from the battery 22 to the one or more external devices 44 via power takeoff 42. More specifically, the sensors may measure the voltage across the inverter circuitry of the power electronics 24 and the current (e.g., amperage) being delivered across the inverter circuitry of the power electronics 24 from the battery 22 to the power takeoff 42 in order to determine the actual power output at the power takeoff 42 being delivered to the one or more external devices 44. It should be noted that electrical power is equal to the product of voltage and current.

The method 200 then moves on to block 212 where it is determined if a difference between the actual power output at the power takeoff 42 being measured at block 210 and the expected power output at the power takeoff 42 determined at block 208 is greater than a threshold. If the difference between the actual power output at the power takeoff 42 being measured at block 210 and the expected power output at the power takeoff 42 determined at block 208 is not greater than threshold, the method 200 moves on to block 214 where the distance-to-empty projection is adjusted to account for the total expected energy use of the one or more external devices 44. More specifically, the total expected energy use of the one or more external devices 44 may be subtracted from the energy of the battery 22 that is available for propelling the vehicle 10 in order to adjust the distance-to-empty projection at block 214.

Returning to block 212, if the difference between the actual power output at the power takeoff 42 being measured at block 210 and the expected power output at the power takeoff 42 determined at block 208 is greater than the threshold, the method 200 moves on to block 216 where the distance-to-empty projection is adjusted based on the actual power output at the power takeoff that was measured at block 210. At block 216, the controller 32 may assume the actual power output at the power takeoff 42 may remain constant throughout the duration of the drive cycle in order to estimate the total energy that will be consumed by the one or more external devices 44 at the power takeoff 42. Alternately, at block the controller 32 may assume the actual power output at the power takeoff 42 may have specific values during specific time windows or specific time durations during the drive cycle in order to estimate the total energy that will be consumed by the one or more external devices 44 at the power takeoff 42. The estimate of the total energy that will be consumed by the one or more external devices 44 at the power takeoff 42 may be subtracted from the energy of the battery 22 that is available for propelling the vehicle 10 in order to adjust the distance-to-empty projection at block 216.

Also, at block 216, a warning may be issued to the vehicle operator that there is a undesirable discrepancy between the actual power output at the power takeoff 42 being measured at block 210 and the expected power output at the power takeoff 42 determined at block 208. Such a warning may be issued on the display 48. The display 48 may also list the external devices 44 that are connected to the power takeoff 42 and/or external devices 44 that are expected to draw power from the power takeoff 42. An expected reduction in distance-to-empty that is associated with the use of each external device 44 may also be shown on the display 48. Based on the difference between the actual power output at the power takeoff 42 and the expected power output at the power takeoff 42 being greater than threshold, the operator may also be prompted at block 216 via the display 48 to review the list of external devices 44 that are expected to draw power from the power takeoff 42, and to update the list due the discrepancy. The method 200 may then return to block 206 if the operator has decided to adjust the list of external devices 44 that are expected to draw power from the power takeoff 42.

It should be understood that the flowchart in FIG. 2 is for illustrative purposes only and that the method 200 should not be construed as limited to the flowchart in FIG. 2. Some of the steps of the method 200 may be rearranged while others may be omitted entirely. It should be further understood that the designations of first, second, third, fourth, etc. for any component, state, or condition described herein may be rearranged in the claims so that they are in chronological order with respect to the claims.

The words used in the specification are words of description rather than limitation, and it is understood that various changes may be made without departing from the spirit and scope of the disclosure. As previously described, the features of various embodiments may be combined to form further embodiments that may not be explicitly described or illustrated. While various embodiments could have been described as providing advantages or being preferred over other embodiments or prior art implementations with respect to one or more desired characteristics, those of ordinary skill in the art recognize that one or more features or characteristics may be compromised to achieve desired overall system attributes, which depend on the specific application and implementation. As such, embodiments described as less desirable than other embodiments or prior art implementations with respect to one or more characteristics are not outside the scope of the disclosure and may be desirable for particular applications.

What is claimed is:
1. A vehicle comprising:
an electric machine configured to propel the vehicle;
a battery configured to provide electrical power to the electric machine;
a power takeoff configured to transfer power from the battery to one or more external devices that are connected to the power takeoff;

an inverter circuit configured transfer power from the battery to the electric machine and from the battery to the power takeoff;
a controller programmed to,
estimate a distance-to-empty based on a charge of the battery,
estimate an expected energy use of the one or more external devices,
adjust the distance-to-empty based on the expected energy use of the one or more external devices, and
in response to a difference between a measured power along the inverter circuit being delivered to the power takeoff and an expected power use of the one or more external devices, which is based on the expected energy use, being greater than a threshold, override adjusting the distance-to-empty based on the expected energy use and adjust the distance-to-empty based on the measured power; and
a display configured to display the adjusted distance-to-empty.

2. The vehicle of claim 1 further comprising a human machine interface configured to receive a user input that corresponds to the expected energy use of the one or more external devices.

3. The vehicle of claim 1, wherein the controller is programmed to estimate the expected energy use of the one or more external devices based on a historical energy usage of the one or more external devices during previous drive cycles.

4. The vehicle of claim 3, wherein the estimate of the expected energy use of the one or more external devices is based on an average of the historical energy usage of the one or more external devices during previous drive cycles.

5. The vehicle of claim 3, wherein the historical energy usage of the one or more external devices includes devices that are connected to and devices that are disconnected from the power takeoff.

6. The vehicle of claim 3, wherein the historical energy usage of the one or more external devices only includes devices that are connected to the power takeoff.

7. The vehicle of claim 1, wherein the controller is further programmed to, in response to one of the external devices being disconnected from the power takeoff, decrease an expected energy use of the disconnected external device to zero and adjust the distance-to-empty based on setting the expected energy use of the disconnected external device to zero.

8. A vehicle comprising:
an electric machine configured to propel the vehicle;
a battery configured to provide electrical power to the electric machine;
a power takeoff configured to transfer power from the battery to one or more external devices;
a display unit configured to display a distance-to-empty; and
a controller programmed to,
adjust the distance-to-empty based on an expected energy use of the one or more external devices, and
in response to a difference between a measured power being delivered to the power takeoff and an expected power use of the one or more external devices, which is based on the expected energy use, being greater than a threshold, override adjusting the distance-to-empty based on the expected energy use and adjust the distance-to-empty based on the measured power.

9. The vehicle of claim 8 further comprising a human machine interface configured to receive a user input that corresponds to the expected energy use of the one or more external devices.

10. The vehicle of claim 8, wherein the controller is programmed to estimate the expected energy use of the one or more external devices based on a historical energy usage of the one or more external devices during previous drive cycles.

11. The vehicle of claim 10, wherein the estimate of the expected energy use of the one or more external devices is based on an average of the historical energy usage of the one or more external devices during previous drive cycles.

12. The vehicle of claim 10, wherein the historical energy usage of the one or more external devices includes devices that are connected to and devices that are disconnected from the power takeoff.

13. The vehicle of claim 10, wherein the historical energy usage of the one or more external devices only includes devices that are connected to the power takeoff.

14. The vehicle of claim 8, wherein the controller is further programmed to, in response to one of the external devices being disconnected from the power takeoff, decrease an expected energy use of the disconnected external device to zero and adjust the distance-to-empty based on setting the expected energy use of the disconnected external device to zero.

15. A method of adjusting a distance-to-empty of an electric vehicle comprising:
calculating the distance-to-empty via a controller based on a charge of a propulsion battery of the electric vehicle;
estimating an expected energy use via the controller of one or more external devices that are configured to draw power from the propulsion battery when connected to a power takeoff of the electric vehicle;
adjusting the distance-to-empty via the controller based on the expected energy use of the one or more external devices;
in response to a difference between a measured power being delivered to the power takeoff and an expected power use of the one or more external devices, which is based on the expected energy use, being greater than a threshold, override adjusting the distance-to-empty via the controller based on the expected energy use and adjust the distance-to-empty via the controller based on the measured power; and
displaying the distance-to-empty on a display unit.

16. The method of claim 15, wherein the expected energy use is based on a user input that corresponds to the expected energy use of the one or more external devices.

17. The method of claim 15, wherein the estimate of the expected energy use of the one or more external devices is based on a historical energy usage of the one or more external devices during previous drive cycles.

18. The method of claim 15, wherein the estimate of the expected energy use of the one or more external devices is based on an average of the historical energy usage of the one or more external devices during previous drive cycles.

* * * * *